(12) United States Patent
van der Mee et al.

(10) Patent No.: US 12,404,368 B2
(45) Date of Patent: Sep. 2, 2025

(54) REINFORCED FLAME RETARDANT POLYCARBONATE COMPOSITIONS WITH IMPROVED MELT VOLUME RATES

(71) Applicant: SHPP GLOBAL TECHNOLOGIES B.V., Bergen op Zoom (NL)

(72) Inventors: Mark Adrianus Johannes van der Mee, Breda (NL); Fabrizio Micciche, Breda (NL); Robert Dirk Van de Grampel, Tholen (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 738 days.

(21) Appl. No.: 17/781,741

(22) PCT Filed: Dec. 15, 2020

(86) PCT No.: PCT/IB2020/061978
§ 371 (c)(1),
(2) Date: Jun. 2, 2022

(87) PCT Pub. No.: WO2021/124112
PCT Pub. Date: Jun. 24, 2021

(65) Prior Publication Data
US 2023/0035378 A1    Feb. 2, 2023

Related U.S. Application Data

(60) Provisional application No. 62/948,523, filed on Dec. 16, 2019.

(51) Int. Cl.
*C08G 69/00* (2006.01)
*C08G 64/02* (2006.01)
*C08G 64/08* (2006.01)
*C08J 5/04* (2006.01)

(52) U.S. Cl.
CPC ............ *C08G 69/00* (2013.01); *C08G 64/02* (2013.01); *C08G 64/08* (2013.01); *C08J 5/043* (2013.01); *C08J 2369/00* (2013.01)

(58) Field of Classification Search
CPC ........ C08G 69/00; C08G 64/02; C08G 64/08; C08G 64/06; C08G 64/12; C08J 5/043; C08J 2369/00; C08L 69/005
See application file for complete search history.

(56) References Cited

U.S. PATENT DOCUMENTS

| | | |
|---|---|---|
| 6,723,864 B2 | 4/2004 | Silva et al. |
| 7,728,059 B2 | 6/2010 | Chen et al. |
| 8,552,096 B2 | 10/2013 | Li et al. |
| 2004/0039145 A1 | 2/2004 | Silva et al. |
| 2005/0182165 A1 | 8/2005 | Ma et al. |
| 2014/0295363 A1 | 10/2014 | Sun et al. |
| 2017/0166742 A1 | 6/2017 | Hoover et al. |
| 2017/0369707 A1 | 12/2017 | Meyer et al. |
| 2019/0284391 A1* | 9/2019 | van de Wetering ..... C08K 7/14 |

FOREIGN PATENT DOCUMENTS

| | | |
|---|---|---|
| WO | 2013020004 A1 | 2/2013 |
| WO | 2013175448 A1 | 11/2013 |
| WO | 2014035452 A1 | 3/2014 |
| WO | 2014072923 A1 | 5/2014 |
| WO | 2016011332 A1 | 1/2016 |
| WO | 2016011334 A1 | 1/2016 |
| WO | 2017203480 A1 | 11/2017 |

OTHER PUBLICATIONS

CN Office Action Search Report Issued Jan. 13, 2023; CN Application No. 202080077351.6; 2 pages; SS230088CN.
International Search Report for International Application No. PCT/IB2020/061978; International filing date: Dec. 2020; Date of Mailing: Dec. 4, 2021; 5 pages.
Written Opinion of the International Searching Authority for International Application No. PCT/IB2020/061978; International filing date: Dec. 2020; Date of Mailing: Dec. 4, 2021; 6 pages.

* cited by examiner

*Primary Examiner* — Andrew J. Oyer
(74) *Attorney, Agent, or Firm* — CANTOR COLBURN LLP

(57) ABSTRACT

A reinforced polycarbonate composition comprising 50-95 wt % of a poly(aliphatic ester-carbonate); 5-40 wt % of a high heat copolycarbonate comprising high heat carbonate units derived from 1,1-bis(4-hydroxyphenyl)-3,3,5-trimethyl-cyclohexane, N-phenyl phenolphthalein bisphenol, 4,4-(1-phenylethylidene)bisphenol, 4,4-(3,3-dimethyl-2,2-dihydro-1H-indene-1,1-diyl)diphenol, 1,1-bis(4-hydroxyphenyl)cyclododecane, 3,8-dihydroxy-5a,10b-diphenyl-coumarano-2',3',2,3-coumarane, or a combination thereof, preferably 1,1-bis(4-hydroxyphenyl)-3,3,5-trimethyl-cyclohexane, N-phenyl phenolphthalein bisphenol, or a combination thereof, and optionally comprising low heat carbonate units; 0.1-0.8 wt % of a $C_{1-16}$ alkyl sulfonate salt flame retardant; 0.1-0.8 wt % of an anti-drip agent; 5-35 wt % glass fibers; wherein each amount is based on the total weight of the reinforced polycarbonate composition, which sums to 100 wt %.

20 Claims, No Drawings

REINFORCED FLAME RETARDANT POLYCARBONATE COMPOSITIONS WITH IMPROVED MELT VOLUME RATES

CROSS REFERENCE TO RELATED APPLICATIONS

This national stage application claims priority to PCT/IB2020/061978, filed Dec. 15, 2020, claims priority to U.S. Provisional Application No. 62/948,523, filed Dec. 16, 2019, both of which are incorporated by reference in their entirety herein.

BACKGROUND

This disclosure relates to polycarbonate compositions, and in particular to reinforced polycarbonate compositions, methods of manufacture, and uses thereof.

Polycarbonates are useful in the manufacture of articles and components for a wide range of applications, from automotive parts to electronic appliances. Because of their broad use, particularly in electronic applications, it is desirable to provide polycarbonates with improved flame retardance and processability.

There accordingly remains a need in the art for reinforced polycarbonate compositions with improved flame retardance at wall thicknesses of 1.5 millimeter and less. It would be a further advantage if the reinforced polycarbonate compositions had an improved melt volume rate.

SUMMARY

The above-described and other deficiencies of the art are met by a reinforced polycarbonate composition comprising: a reinforced polycarbonate composition comprising 50-95 wt % of a poly(aliphatic ester-carbonate); 5-40 wt % of a high heat copolycarbonate comprising high heat carbonate units derived from 1,1-bis(4-hydroxyphenyl)-3,3,5-trimethyl-cyclohexane, N-phenyl phenolphthalein bisphenol, 4,4'-(1-phenylethylidene)bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a,10b-Biphenylcoumarano-2',3',2,3-coumarane, or a combination thereof, preferably 1,1-bis(4-hydroxyphenyl)-3,3,5-trimethyl-cyclohexane, N-phenyl phenolphthalein bisphenol, or a combination thereof, and optionally comprising low heat carbonate units; 0.1-0.8 wt %, preferably 0.1-0.5 wt % of a $C_{1-16}$ alkyl sulfonate salt flame retardant; 0.1-0.8 wt %, preferably 0.1-0.5 wt % of an anti-drip agent; 5-35 wt % glass fibers; optionally 0.1-10 wt % of an additive composition; optionally 1-30 wt % of a polycarbonate different from the poly(aliphatic ester-carbonate), the high heat copolycarbonate, and the poly(carbonate-siloxane), wherein the polycarbonate has a molecular weight of less than 24,000 grams per mole, as measured via gel permeation chromatography using polystyrene standards and calculated for polycarbonate, wherein each amount is based on the total weight of the reinforced polycarbonate composition, which sums to 100 weight percent.

In another aspect, a method of manufacture comprises combining the above-described components to form a reinforced polycarbonate composition.

In yet another aspect, an article comprises the above-described reinforced polycarbonate composition.

In still another aspect, a method of manufacture of an article comprises molding, extruding, or shaping the above-described reinforced polycarbonate composition into an article.

The above described and other features are exemplified by the following detailed description, examples, and claims.

DETAILED DESCRIPTION

The inventors hereof discovered that reinforced polycarbonate compositions having poly(aliphatic ester carbonate), a high heat polycarbonate, a $C_{1-16}$ alkyl sulfonate salt flame retardant, and an anti-drip agent resulted in a flame test rating of V0 at 1.5 millimeter (mm). Conventional loadings of $C_{1-16}$ alkyl sulfonate salt flame retardants (e.g., 0.08 wt %) fail to provide sufficient flame retardancy at wall thicknesses of 1.5 mm or lower. Surprisingly, polycarbonate properties such as Vicat softening temperature and melt volume rate were maintained and/or improved in the reinforced polycarbonate compositions including a poly(aliphatic ester carbonate) and a high heat polycarbonate with a loading of the $C_{1-6}$ alkyl sulfonate salt flame retardant ranging from 0.1 to 0.8 wt % and 0.1 to 0.8 wt % of an anti-drip agent, based on the total weight of reinforced polycarbonate composition. It is a further advantage that the reinforced polycarbonate compositions can accommodate colorants such as pigments and dyes without a loss of flame retardance.

The reinforced polycarbonate compositions include a poly(aliphatic ester-carbonate); a high heat copolycarbonate, a $C_{1-16}$ alkyl sulfonate salt flame retardant; an anti-drip agent; and glass fibers. The individual components of the reinforced polycarbonate composition are described in more detail below.

"Polycarbonate" as used herein means a polymer having repeating structural carbonate units of formula (1)

in which at least 60 percent of the total number of $R^1$ groups contain aromatic moieties and the balance thereof are aliphatic, alicyclic, or aromatic. In an aspect, each $R^1$ is a $C_{6-30}$ aromatic group, that is, contains at least one aromatic moiety. $R^1$ can be derived from an aromatic dihydroxy compound of the formula HO—$R^1$—OH, in particular of formula (2)

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Preferably, each $R^1$ can be derived from a bisphenol of formula (3)

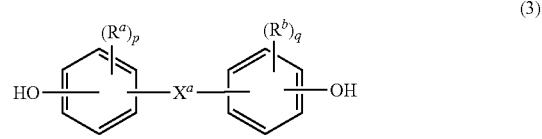

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group. In an aspect, the bridging group $X^a$ is single bond, —O—, —S—, —S(O)—, —S(O)$_2$—, —C(O)—, or a $C_{1-60}$ organic group. The organic bridging group can be cyclic or acyclic, aromatic or non-aromatic, and can further comprise heteroatoms such as halogens, oxygen, nitrogen, sulfur, silicon, or phosphorous. The $C_{1-60}$ organic group can be disposed such that the $C_6$ arylene groups connected thereto are each connected to a common alkylidene carbon or to different carbons of the $C_{1-60}$ organic bridging group. In an aspect, p and q is each 1, and $R^a$ and $R^b$ are each a $C_{1-3}$ alkyl group, preferably methyl, disposed meta to the hydroxy group on each arylene group.

"Polycarbonates" include homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units.

The reinforced polycarbonate compositions include a poly(aliphatic ester-carbonate), which is a specific example of a poly(ester-carbonate). The a poly(aliphatic ester-carbonate)s of the reinforced polycarbonate compositions are derived from a linear $C_{6-20}$ aliphatic dicarboxylic acid (which includes a reactive derivative thereof), specifically a linear $C_{6-12}$ aliphatic dicarboxylic acid (which includes a reactive derivative thereof). Specific dicarboxylic acids include n-hexanedioic acid (adipic acid), n-decanedioic acid (sebacic acid), and alpha, omega-$C_{12}$ dicarboxylic acids such as dodecanedioic acid (DDDA). A specific poly(aliphatic ester)-polycarbonate is of formula (8):

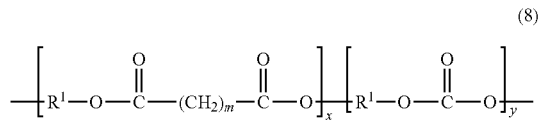

(8)

wherein each $R^1$ can be the same or different, and is as described in formula (1), m is 4 to 18, preferably 4 to 10, and the average molar ratio of ester units to carbonate units x:y is 99:1 to 1:99, including 13:87 to 2:98, or 9:91 to 2:98, or 8:92 to 2:98. In a specific aspect, the poly(aliphatic ester)-polycarbonate copolymer comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN™ HFD from SABIC (LEXAN is a trademark of SABIC or its affiliates).

The poly(aliphatic ester-carbonate) can have a weight average molecular weight of 18,000 to 25,000 grams per mole (g/mol) preferably 20,000 to 25,000 g/mol; or 30,000 to 40,000 g/mol, preferably 35,000 to 40,000 g/mol, each as measured by GPC using polystyrene standards and calculated for polycarbonate. As used herein, "using polystyrene standards and calculated for polycarbonate" refers to measurement of the retention time by GPC, fitting the retention time value to a curve for polystyrene and calculating the molecular weight for polycarbonate.

The poly(aliphatic ester-carbonate) can be present from 50-95 wt %, 55-90 wt %, 55-85 wt %, or 55-80 wt %, each based on the total weight of reinforced polycarbonate composition.

The reinforced polycarbonate compositions include a high heat copolycarbonate derived from high heat carbonate units and optionally, low heat carbonate units. The low heat carbonate units are derived from low heat bisphenol units that are derived from low heat bisphenol groups. The low heat bisphenol group can be of formula (3)

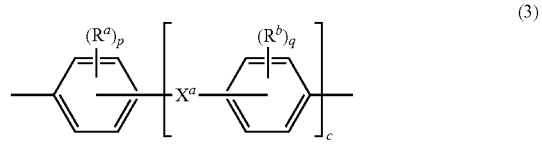

(3)

wherein $R^a$ and $R^b$ are each independently a halogen, $C_{1-3}$ alkoxy, or $C_{1-3}$ alkyl, c is 0 to 4, and p and q are each independently integers of 0 or 1. In an aspect, p and q is each 0, or p and q is each 1 and $R^a$ and $R^b$ are each a methyl, disposed meta to the hydroxy group on each arylene group. $X^a$ in formula (3) is a bridging group connecting the two hydroxy-substituted aromatic groups, where the bridging group and the hydroxy substituent of each $C_6$ arylene group are disposed ortho, meta, or para (preferably para) to each other on the $C_6$ arylene group, for example, a single bond, —O—, —S—, —S(O)—, —S(O)$_2$—, —C(O)—, or a $C_{1-6}$ organic group, which can be cyclic or acyclic, aromatic or non-aromatic, and can further comprise heteroatoms such as halogens, oxygen, nitrogen, sulfur, silicon, or phosphorous. For example, $X^a$ can be a $C_{3-6}$ cycloalkylidene, a $C_{1-6}$ alkylidene of the formula —C($R^c$)($R^d$)— wherein $R^c$ and $R^d$ are each independently hydrogen, $C_{1-5}$ alkyl, or a group of the formula —C(=$R^e$)— wherein $R^e$ is a divalent $C_{1-5}$ hydrocarbon group. Some illustrative examples of dihydroxy compounds that can be used in the manufacture of the low heat monomer units are described, for example, in WO 2013/175448 A1, US 2014/0295363, and WO 2014/072923.

In an aspect, the low heat bisphenol unit is bisphenol A, which provides the low heat group of formula (3a).

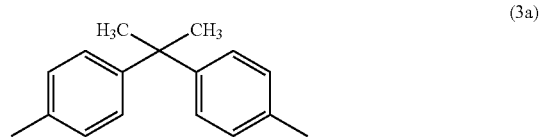

(3a)

The high heat bisphenol unit is derived from a high heat bisphenol group (i.e., monomer) having at least 19 carbon atoms. As used herein, a high heat bisphenol monomer is a monomer where the corresponding homopolycarbonate of the monomer has a glass transition temperature (Tg) of 155° C. or higher. Examples of such high heat bisphenol groups include groups of formulas (4) to (10)

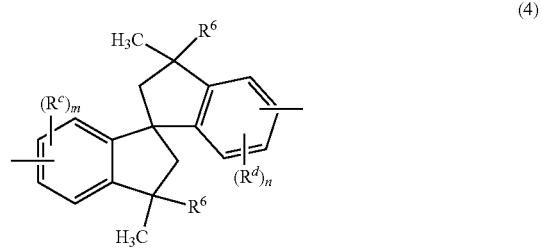

(4)

-continued

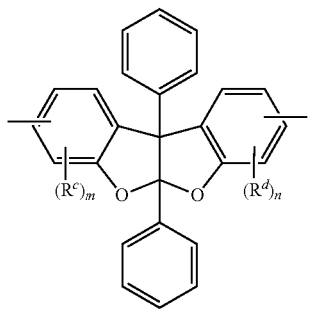
(5)

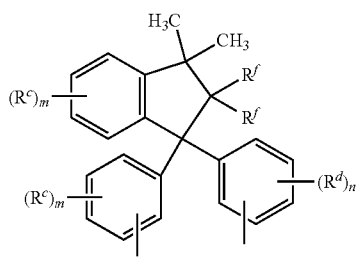
(6)

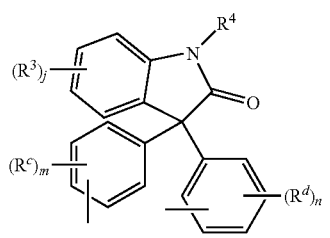
(7)

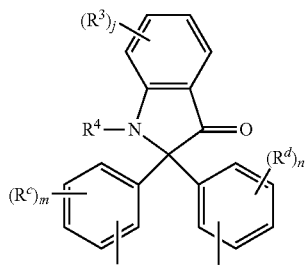
(8)

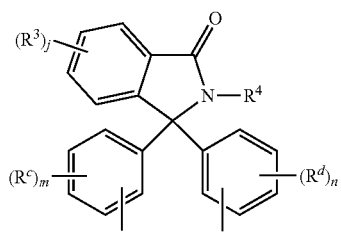
(9)

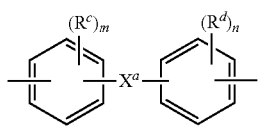
(10)

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^f$ is hydrogen or both $R_f$ together are a carbonyl group, each $R^3$ is independently $C_{1-6}$ alkyl, $R^4$ is hydrogen, $C_{1-6}$ alkyl, or phenyl optionally substituted with 1 to 5 $C_{1-6}$ alkyl groups, $R^6$ is independently $C_{1-3}$ alkyl, or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^f$)($R^g$)— wherein $R^f$ is hydrogen, $C_{1-12}$ alkyl, or $C_{6-12}$ aryl and $R^g$ is $C_{6-8}$ alkyl, $C_{6-8}$ cycloalkyl, or $C_{6-12}$ aryl, or -($Q^a$)$_x$-G-($Q^b$)$_y$- group, wherein $Q^a$ and $Q^b$ are each independently a $C_{1-3}$ alkylene, G is a $C_{3-10}$ cycloalkylene, x is 0 or 1, and y is 0 or 1, and j, m, and n are each independently 0 to 4. A combination of high heat bisphenol groups can be used.

In an aspect, $R^c$ and $R^d$ are each independently a $C_{1-3}$ alkyl, or $C_{1-3}$ alkoxy, each $R^6$ is methyl, each $R^3$ is independently $C_{1-3}$ alkyl, $R^4$ is methyl, or phenyl, each $R^6$ is independently $C_{1-3}$ alkyl, or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^f$)($R^g$)— wherein $R^f$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl, or -($Q^1$)$_x$-G-($Q^2$)$_y$- group, wherein $Q^1$ and $Q^2$ are each independently a $C_{1-3}$ alkylene and G is a $C_{3-10}$ cycloalkylene, x is 0 or 1, and y is 0 or 1, and j, m, and n are each independently 0 or 1.

Exemplary high heat bisphenol groups include those of formulas (9a) and (10a) to (10k)

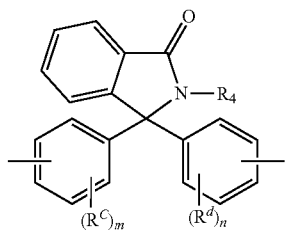
(9a)

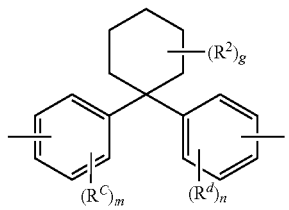
(10a)

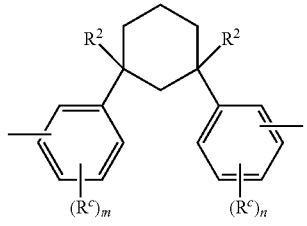
(10b)

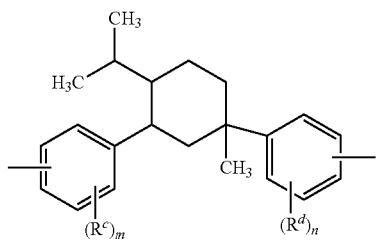
(10c)

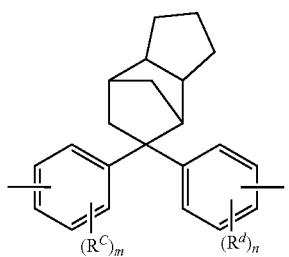
(10d)

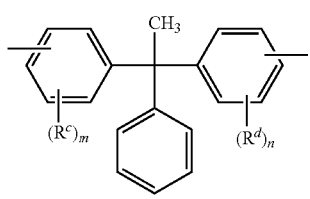
(10e)

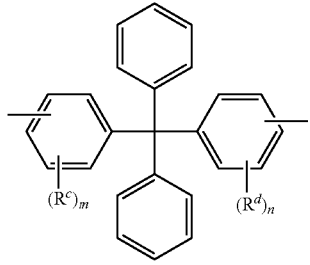
(10f)

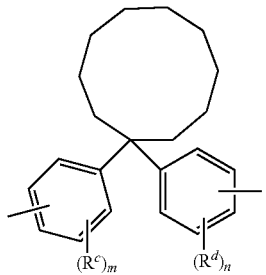
(10g)

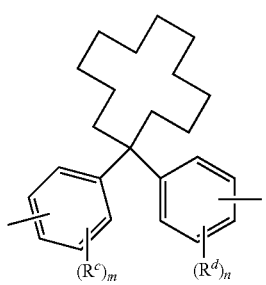
(10i)

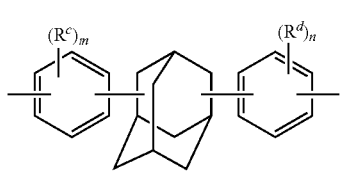
(10j)

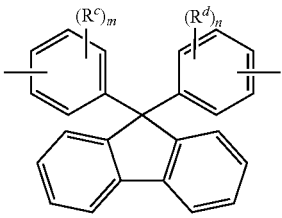
(10k)

wherein $R^c$ and $R^d$ are the same as defined for formulas (4) to (10), each $R^2$ is independently $C_{1-4}$ alkyl, m and n are each independently 0 to 4, each $R^3$ is independently $C_{1-4}$ alkyl or hydrogen, $R^4$ is $C_{1-6}$ alkyl or phenyl optionally substituted with 1 to 5 $C_{1-6}$ alkyl groups, and g is 0 to 10. In a specific aspect each bond of the bisphenol group is located para to the linking group that is $X^a$. In an aspect, $R^c$ and $R^d$ are each independently a $C_{1-3}$ alkyl, or $C_{1-3}$ alkoxy, each $R^2$ is methyl, x is 0 or 1, y is 1, and m and n are each independently 0 or 1.

The high heat bisphenol group is preferably of formula (9a-2) or (10a-2)

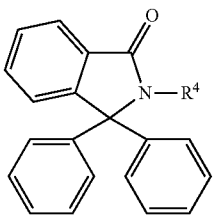
(9a-2)

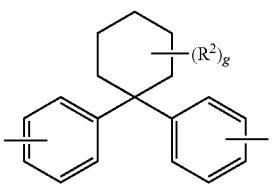
(10a-2)

wherein $R^4$ is methyl or phenyl, each $R^2$ is methyl, and g is 1 to 4. Preferably, the high heat bisphenol group is derived from 2-phenyl-3,3'-bis(4-hydroxyphenyl) phthalimidine (PPPBP) or from 1,1-bis(4-hydroxyphenyl)-3,3,5-trimethyl-cyclohexane (BP-TMC).

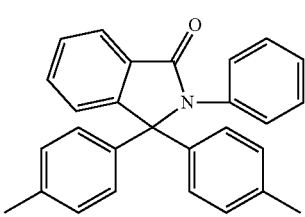
(PPPBP group)

-continued

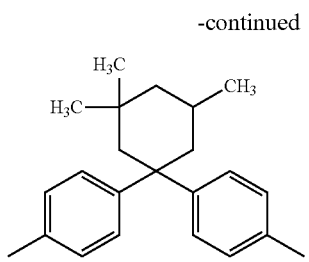

(BP-TMC group)

The high heat copolycarbonate can be present from 5-40 wt %, 5-35 wt %, 5-30 wt %, 5-25 wt %, 10-30 wt %, or 10-25 wt %, each based on the total weight of reinforced polycarbonate composition.

The reinforced polycarbonate compositions can include a polycarbonate different from the poly(aliphatic ester-carbonate) and the high heat copolycarbonate, having a molecular weight of less than 24,000 grams/mole, as measured by gel permeation chromatography (GPC), using a crosslinked styrene-divinylbenzene column using polystyrene standards and calculated for polycarbonate. GPC samples are prepared at a concentration of 1 mg per ml and are eluted at a flow rate of 1.5 ml per minute. When present, the polycarbonate different from the poly(aliphatic ester-carbonate) and the high heat copolycarbonate can range from 1-30 wt %, 1-25 wt %, 1-20 wt %, 1-15 wt %, 1-10 wt %, 1-5 wt %, 5-30 wt %, 5-25 wt %, 5-20 wt %, 5-15 wt %, 5-10 wt %, 10-30 wt %, 10-25 wt %, 10-20 wt %, or 10-15 wt %, 15-30 wt %, 15-25 wt %, 15-20 wt %, 20-30 wt %, or 25-30 wt %, each based on the total weight of reinforced polycarbonate composition. In an aspect, the polycarbonate different from the poly(aliphatic ester-carbonate) and the high heat copolycarbonate is a homopolycarbonate derived from a bisphenol of formula (2), preferably bisphenol A, in which each of $A^1$ and $A^2$ is p-phenylene and $Y^1$ is isopropylidene in formula (2). The homopolycarbonate can have an intrinsic viscosity, as determined in chloroform at 25° C., of 0.3-1.5 deciliters per gram (dl/gm), preferably 0.45-1.0 dl/gm. The bisphenol A homopolycarbonate can have a Mw of 10,000 to less than 24,000 g/mol, 15,000 to less than 24,000 g/mol, 17,000 to less than 24,000 g/mol, or 20,000 to less than 24,000 g/mol, each as measured as described above.

The polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryloyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05-2.0 wt %. Combinations comprising linear polycarbonates and branched polycarbonates can be used.

The reinforced polycarbonate compositions include a $C_{1-16}$ alkyl sulfonate salt flame retardant such as potassium perfluorobutane sulfonate (Rimar salt), potassium perfluoroctane sulfonate, tetraethylammonium perfluorohexane sulfonate, or a combination thereof. The $C_{1-16}$ alkyl sulfonate salt flame retardant is present from 0.1-0.8 wt %, preferably 0.1-0.5 wt %, each based on of the total weight of the reinforced polycarbonate composition. In some aspects, potassium diphenylsulfone sulfonate, sodium benzene sulfonate, sodium toluene sulfonate, potassium diphenylsulfone sulfonate, or a combination thereof can be used in combination with the $C_{1-16}$ alkyl sulfonate salt flame retardant.

The reinforced polycarbonate composition can include an additional flame retardant different from the $C_{1-16}$ alkyl sulfonate salt flame retardants. In some aspects, the additional flame retardant includes an inorganic flame retardant salt. Salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, or $Na_3AlF_6$ can also be used. When present, inorganic flame retardant salts other than $C_{1-16}$ alkyl sulfonate salts are present in amounts of 0.01 to 1 parts by weight, more preferably 0.02 to 1 parts by weight, based on 100 parts by weight of the total composition.

The additional flame retardant different from the $C_{1-16}$ alkyl sulfonate salt flame retardant can include an aromatic organophosphorous compound. In the aromatic organophosphorous compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the organophosphorous compound, or bonded via another moiety, for example an alkylene group. The aromatic moiety of the aromatic group can be directly bonded to the organophosphorous compound, or bonded via another moiety, for example an alkylene group. In an aspect the aromatic group is the same as an aromatic group of the polycarbonate backbone, such as a bisphenol group (e.g., bisphenol A), a monoarylene group (e.g., a 1,3-phenylene or a 1,4-phenylene), or a combination thereof.

The organophosphorous compound can be a phosphate ($P(=O)(OR)_3$), phosphite ($P(OR)_3$), phosphonate ($RP(=O)(OR)_2$), phosphinate ($R_2P(=O)(OR)$), phosphine oxide ($R_3P(=O)$), or phosphine ($R_3P$), wherein each R in the foregoing organophosphorous compounds can be the same or different, provided that at least one R is an aromatic group. A combination of different organophosphorous compounds can be used. The aromatic group can be directly or indirectly bonded to the phosphorus, or to an oxygen of the organophosphorous compound (i.e., an ester).

In an aspect the aromatic organophosphorous compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some aspects G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic organophosphorous compounds are also useful, for example, compounds of the formulas

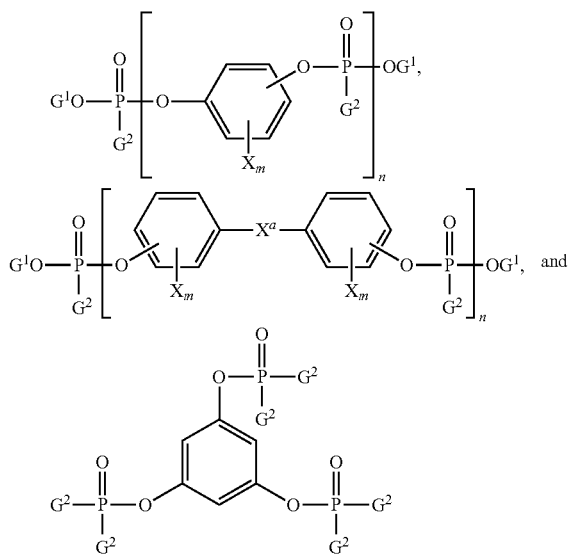

wherein each $G^1$ is independently a $C_{1-30}$ hydrocarbyl; each $G^2$ is independently a $C_{1-30}$ hydrocarbyl or hydrocarbyloxy; $X^a$ is as defined in formula (3) or formula (4); each X is independently a bromine or chlorine, m is 0 to 4, and n is 1 to 30. In a specific aspect, $X^a$ is a single bond, methylene, isopropylidene, or 3,3,5-trimethylcyclohexylidene.

Specific aromatic organophosphorous compounds are inclusive of acid esters of formula (9)

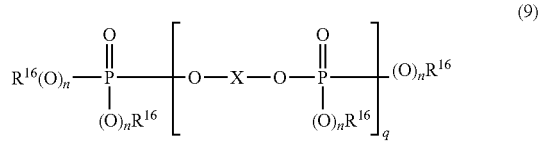

(9)

wherein each $R^{16}$ is independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one $R^{16}$ or X is an aromatic group; each n is independently 0 or 1; and q is from 0.5 to 30. In some aspects each $R^{16}$ is independently $C_{1-4}$ alkyl, naphthyl, phenyl($C_{1-4}$)alkylene, aryl groups optionally substituted by $C_{1-4}$ alkyl; each X is a mono- or poly-nuclear aromatic $C_{6-30}$ moiety, each n is 1; and q is from 0.5 to 30. In some aspects each $R^{16}$ is aromatic, e.g., phenyl; each X is a mono- or poly-nuclear aromatic $C_{6-30}$ moiety, including a moiety derived from formula (2); n is one; and q is from 0.8 to 15. In other aspects, each $R^{16}$ is phenyl, X is cresyl, xylenyl, propylphenyl, or butylphenyl, one of the following divalent groups

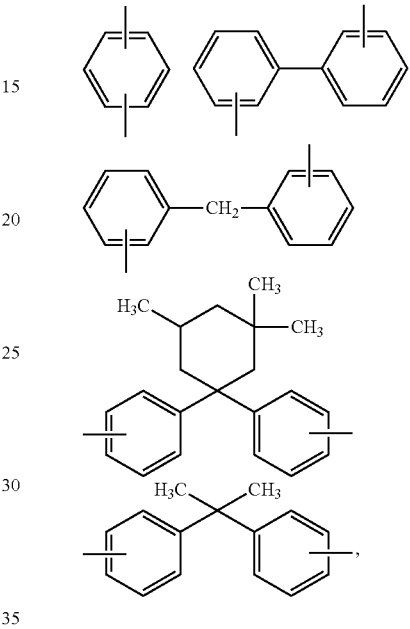

or a combination comprising one or more of the foregoing; n is 1; and q is from 1 to 5, or from 1 to 2. In some aspects at least one $R^{16}$ or X corresponds to a monomer used to form the polycarbonate, e.g., bisphenol A, resorcinol, or the like. Aromatic organophosphorous compounds of this type include the bis(diphenyl) phosphate of hydroquinone, resorcinol bis(diphenyl phosphate) (RDP), and bisphenol A bis(diphenyl) phosphate (BPADP), and their oligomeric and polymeric counterparts.

The organophosphorous compound containing a phosphorus-nitrogen bond can be a phosphazene, phosphonitrilic chloride, phosphorus ester amide, phosphoric acid amide, phosphonic acid amide, phosphinic acid amide, or tris(aziridinyl) phosphine oxide. These flame-retardant additives are commercially available. In an aspect, the organophosphorous compound containing a phosphorus-nitrogen bond is a phosphazene or cyclic phosphazene of the formulas

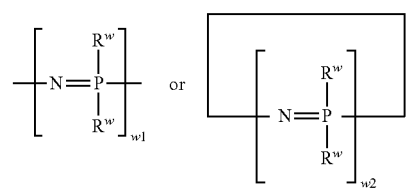

wherein w1 is 3 to 10,000; w2 is 3 to 25, or 3 to 7; and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. In an aspect, the phosphazene has a structure represented by the formula

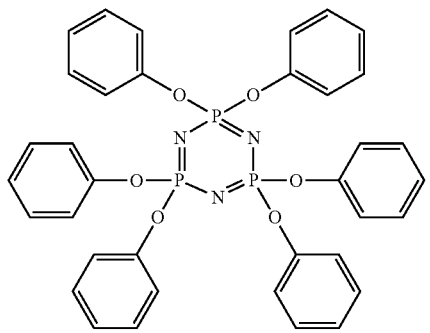 [SMILES: c1ccc(OP2(Oc3ccccc3)=NP(Oc3ccccc3)(Oc3ccccc3)=NP(Oc3ccccc3)(Oc3ccccc3)=N2)cc1]

Commercially available phenoxyphosphazenes having the aforementioned structures are LY202 manufactured and distributed by Lanyin Chemical Co., Ltd, FP-110 manufactured and distributed by Fushimi Pharmaceutical Co., Ltd, and SPB-100 manufactured and distributed by Otsuka Chemical Co., Ltd.

Anti-drip agents are present in reinforced polycarbonate composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Anti-drip agents can be used in amounts of 0.1-0.8 wt %, preferably 0.1-0.5 wt % based on total weight of reinforced polycarbonate composition.

The $C_{1-16}$ alkyl sulfonate salt flame retardant and the anti-drip agent can be present in a ratio of 1:4 to 4:1, 1:4 to 3:2, or 1:4 to 1:1.

The reinforced polycarbonate composition includes glass fibers. The term "glass" refers to a material, natural or synthetic, which contains silicon dioxide ($SiO_2$) or silica as its main material. The glass fibers can be textile glass fibers such as E, A, C, ECR, R, S, D, and/or NE glass fibers, and are desirably E type glass fibers. The glass fibers can be provided in the form of monofilament or multifilament fibers and can be used either alone or in combination with other types of fibers, for example, co-weaving or core/sheath, side-by-side, skin-core type or matrix and fibril constructions. The glass fibers can be supplied in the form of rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. The preferred filaments for plastic reinforcement are made by mechanical pulling.

The glass fiber can be a chopped glass fiber, long glass fiber, glass filament, woven glass fiber, or a combination thereof. In an aspect, the glass fiber can further be combined with carbon fiber, woven carbon fiber, ceramic fiber, or a combination thereof.

The glass fibers can be continuous or chopped, preferably chopped. Glass fibers in the form of chopped strands may have a length of 0.3 millimeters (mm) to 10 centimeters (cm), preferably 0.5 mm to 5 cm or 3 mm to 13 mm. The glass fibers can have a length from 0.2-20 mm, preferably 0.2-10 mm, more preferably 0.7-7 mm. The glass fibers can have any cross-section, such as a round (or circular), flat, bilobe, or irregular cross-section. The average diameter of the glass fibers can be from 1-25 micrometers (μm), preferably 3-20 μm, more preferably 4-18 μm, even more preferably 5-17 μm. The glass fiber can be a short glass fiber having a diameter of 10 μm or 14 μm. In an aspect, the glass fiber has a circular cross-section. Flat glass or bilobe fibers can be used to provide, for example, low warp-high strength-high elongation articles.

The glass fibers can be coated with a sizing composition that is non-bonding with respect to the polycarbonate composition (e.g., the poly(aliphatic ester-carbonate) and the high heat copolycarbonate). These coated glass fibers are also referred to herein as "non-bonding glass fibers". As used herein, "non-bonding glass fiber" means the glass fiber is coated with a sizing composition that results in poor adhesion of the coated glass fiber to the polycarbonate matrix. In other words, a non-bonding glass fiber is coated with a sizing composition that is incompatible with the polycarbonate matrix, which is in contrast to a non-bonding glass fiber coated with a sizing composition that has improved adhesion with the polycarbonate matrix (herein referred to as "bonding glass fibers" because they are bonding with respect to the polycarbonate).

The sizing composition can include an aminosilane, a mercaptosilane, a poly(ether silane), a ureidosilane, or a combination thereof. The sizing composition can further include epoxide, poly(vinyl acetate), polyester, starch, poly(acrylic acid), melamine, poly(vinyl chloride), poly($C_{1-3}$ alkylene oxide), polyurethane, polyepoxide, poly(vinyl alcohol), a $C_{1-6}$ organosilane, or a combination thereof. The polyepoxide can be a phenolic epoxy resin, an epoxylated carboxylic acid derivative (e.g., a reaction product of an ester of a polycarboxylic acid having one or more unesterified carboxyl groups with a compound including more than one epoxy group), an epoxidized diene polymer, an epoxidized polyene polymer, or a combination thereof. Exemplary compounds that can be included in the sizing composition include silanes such as tri($C_{1-6}$ alkoxy)monoamino silane, tri($C_{1-6}$ alkoxy)diamino silane, tri($C_{1-6}$ alkoxy)($C_{1-6}$ alkyl ureido) silane, tri($C_{1-6}$ alkoxy)(epoxy $C_{1-6}$ alkyl) silane, tri($C_{1-6}$ alkoxy)(glycidoxy $C_{1-6}$, alkyl) silane, tri($C_{1-6}$ alkoxy)(mercapto $C_{1-6}$ alkyl) silane, or a combination thereof. Specific silanes include (3-aminopropyl)triethoxysilane, (3-glycidoxypropyl)trimethoxysilane, (2-(3,4-epoxycyclohexyl)ethyl)triethoxysilane, (3-mercaptopropyl)trimethoxysilane, (3-(2-aminoethylamino)propyl)triethoxysilane, (3-ureidopropyl)triethoxysilane, or a combination thereof. For example, the sizing composition can include an aminosilane and a polyepoxide.

Other materials that can be included in the sizing composition include, but are not limited to, anti-static agents, other coupling agents, lubricants, wetting agents, or the like.

The sizing composition can be used in an amount from 0.1 to 5 wt % based on the weight of the glass fibers. The sizing composition may be applied to the glass fibers by any means, such as immersing the glass fibers in the sizing composition or contacting the glass fibers with an aqueous emulsion or suspension of the sizing composition. Other coating methods include using an aqueous dispersion of the sizing composition applied to the uncoated glass fibers by a roller in a continuous fashion, which can be followed by a heat treatment or curing step. Each glass fiber can be substantially coated (e.g., entirely coated) with the sizing composition, or at least a portion of the glass fiber can be coated with the sizing composition.

The glass fibers can be present from 5-35 wt %, 5-30 wt %, 5-25 wt %, 5-20 wt %, or 5-15 wt %, each based on the total weight of the reinforced polycarbonate composition.

The reinforced polycarbonate composition can further comprise an additive composition that can include various additives ordinarily incorporated into polymer compositions of this type, with the proviso that the additive(s) are selected so as to not significantly adversely affect the desired properties of the thermoplastic composition, in particular heat resistance, impact, and flame retardance. Combinations of additives can be used. The additive composition can include an impact modifier, flow modifier, a reinforcing filler other than glass fibers, a particulate filler (e.g., a particulate polytetrafluoroethylene (PTFE), carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, a flame retardant different from the $C_{1-16}$ alkyl sulfonate salt, or a combination thereof. The additive composition can be present from 0.1 to 10 wt %, or 0.1-5 wt %, or 0.1-3 wt %, or 0.1-2 wt % of the reinforced polycarbonate composition, each based on the total weight of the reinforced polycarbonate composition.

The reinforced polycarbonate compositions can include a filler or a reinforcing agent different from the glass fibers. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like, oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (atmospheres), or the like; kaolin, including hard kaolin, soft kaolin, calcined kaolin, kaolin comprising various coatings known in the art to facilitate compatibility with the polymer matrix, or the like; single crystal fibers or "whiskers" such as silicon carbide, alumina, boron carbide, iron, nickel, copper, or the like; fibers (including continuous and chopped fibers) such as asbestos, carbon fibers; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic polymers, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or a combination thereof.

The fillers and reinforcing agents can be coated with a layer of metallic material to facilitate conductivity, or surface treated with silanes to improve adhesion and dispersion with the polymer matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Co-woven structures include glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like, non-woven fibrous reinforcements such as continuous strand mat, chopped strand mat, tissues, papers and felts or the like, or three-dimensional reinforcements such as braids.

There is considerable overlap among plasticizers, lubricants, and mold release agents, which include, for example, phthalic acid esters (e.g., octyl-4,5-epoxy-hexahydrophthalate), tris-(octoxycarbonylethyl)isocyanurate, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); fatty acid esters (e.g., $C_{1-32}$alkyl stearyl esters, such as methyl stearate and stearyl stearate and esters of stearic acid such as pentaerythritol tetrastearate, glycerol tristearate (GTS), and the like), waxes (e.g., beeswax, montan wax, paraffin wax, or the like), or combinations comprising at least one of the foregoing plasticizers, lubricants, and mold release agents. These are generally used in amounts of 0.01-5 wt %, based on the total weight of total weight of the reinforced polycarbonate composition, which sums to 100 wt %.

Antioxidant additives include organophosphites such as tris(nonylphenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane, butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. Antioxidants are used in amounts of 0.01-0.2, or 0.01-0.1 parts by weight, based on the total weight of the reinforced polycarbonate composition, which sums to 100 wt %.

Colorants such as pigment or dye additives can also be present. Useful pigments can include, for example, inorganic pigments such as metal oxides and mixed metal oxides such as zinc oxide, titanium dioxides, iron oxides, or the like, sulfides such as zinc sulfides, or the like, aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or a combination thereof.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; naphthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like, luminescent dyes such as 7-amino-4-methylcoumarin, 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylenbis(5-phenyloxazole); rhodamine 700; rhodamine 800; pyrene, chrysene, rubrene, coronene, or the like; or a combination thereof.

The reinforced polycarbonate composition can be essentially free of chlorine and bromine. "Essentially free of chlorine and bromine" refers to materials produced without the intentional addition of chlorine or bromine or chlorine or bromine containing materials. It is understood however that in facilities that process multiple products a certain amount of cross contamination can occur resulting in bromine or chlorine levels typically on the parts per million by weight scale. With this understanding it can be readily appreciated that "essentially free of bromine and chlorine" can be defined as having a bromine or chlorine content of less than or equal to 100 parts per million by weight (ppm), less than or equal to 75 ppm, or less than or equal to 50 ppm. In some aspects, "essentially free of bromine and chlorine" means a total bromine and chlorine content of less than or equal to 100 parts per million by weight, or less than or equal to 75 ppm, or less than or equal to 50 ppm. When this definition is applied to the flame retardant it is based on the total weight of the flame retardant. When this definition is applied to the reinforced polycarbonate composition it is based on the total parts by weight of the reinforced polycarbonate composition.

The reinforced polycarbonate compositions can be manufactured by various methods. For example, powdered polycarbonates, flame retardant, or other optional components are first blended, optionally with fillers in a HENSCHEL-Mixer high speed mixer. Other low shear processes, including but not limited to hand mixing, can also accomplish this blending. The blend is then fed into the throat of a twin-screw extruder via a hopper. Alternatively, at least one of the components, for example the reinforcing filler, can be incorporated into reinforced polycarbonate composition by feeding directly into the extruder at the throat or downstream through a sidestuffer. Additives can also be compounded into a masterbatch with a desired polymeric polymer and fed into the extruder. The extruder is generally operated at a temperature higher than that necessary to cause reinforced polycarbonate composition to flow. The extrudate is immediately quenched in a water bath and pelletized. The pellets so prepared can be one-fourth inch long or less as desired. Such pellets can be used for subsequent molding, shaping, or forming.

A molded sample of the reinforced polycarbonate composition can have a flame test rating of V0, as measured according to UL-94 at a thickness of 1.5 mm.

The reinforced polycarbonate composition can have a melt volume rate (MVR) of at least 8, preferably at least 10, more preferably at least 12 centimeters cubed per 10 minutes, measured at 300° C. using a 1.2 kilogram weight according to ISO 1133. In some aspects, the MVR can be 8-35, 8-30, 8-25, 10-35, 10-30, or 10-25 centimeters cubed per 10 minutes, measured at 300° C. using a 1.2 kilogram weight according to ISO 1133.

A molded sample of the reinforced polycarbonate composition can have a Vicat softening temperature of at least 130° C. as measured on 4 mm ISO bars in accordance with the ISO-306 standard at a load of 50 N and a heating rate of 50°/hr (B50).

A molded sample of the reinforced polycarbonate composition can have a gloss at 60° of at least 70, preferably at least 80 gloss units, more preferably at least 90 gloss units, according to ASTMD2457. In some aspects, the gloss at 60° is 70-110, 70-100, 80-110, or 80-100, or 90-110 according to ASTMD2457.

Shaped, formed, or molded articles comprising the polycarbonate compositions are also provided. The polycarbonate compositions can be molded into useful shaped articles by a variety of methods, such as injection molding, extrusion, rotational molding, blow molding and thermoforming. Some examples of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. In an aspect, the article is an extruded article, a molded article, pultruded article, a thermoformed article, a foamed article, a layer of a multi-layer article, a substrate for a coated article, or a substrate for a metallized article. The article can be a housing, a frame, or an enclosure for an electronic, a medical, an automotive, or an electrical device, preferably, a computer or business machine housing, a housing for a hand-held electronic device, a component of a lighting fixture or home appliance, a component of a medical application or device, or a component of an interior or exterior component of an automobile.

This disclosure is further illustrated by the following examples, which are non-limiting.

EXAMPLES

The following components are used in the examples. Unless specifically indicated otherwise, the amount of each component is in weight percent (wt %), based on the total weight of reinforced polycarbonate composition.

The materials shown in Table 1 were used.

TABLE 1

| Component | Description (Trade name) | Source |
|---|---|---|
| PC-2 | Amorphous bisphenol A polycarbonate homopolymer produced by interfacial polymerization (Mw = 30,000-31,000 g/mol, using polystyrene standards and calculated for polycarbonate) | SABIC |
| PC-3 | Sebacic acid-bisphenol A copolymer, 8.5 mol % sebacic acid, PDI = 2.7, biocontent = 6.0%, p-cumylphenol endcap, MFR = 6.5 g/10 min based on ASTM D1238, Mw = 36,000-37,000, determined via GPC using polystyrene standards and calculated for polycarbonate | SABIC |
| PPPBP—BPA | Poly (N-phenyl phenolphthaleinyl bisphenol, 2,2-bis(4-hydro) carbonate-bisphenol A carbonate), 35 mol % PPPBP units; Mw = 24,000-26,000 g/mol determined via GPC using polystyrene standards and calculated for polycarbonate; made by interfacial polymerization; PCP end-capped; PDI = 2-3 | SABIC |
| Rimar | Potassium perfluorobutane sulfonate | 3M |
| TSAN | Encapsulated Polytetrafluoroethylene, CAS Reg. No. 9002-84-0, having the tradename TSAN, with 47-53 wt % poly(tetrafluoroethylene) | SABIC |
| PETS | Pentaerythritol tetrastearate, >90% esterified | Faci |
| GF | Chopped E-glass fiber, 14 micrometer diameter, polyolefin amino silane coaling, available under the trade name OCV-415CA | Vetrotex |
| Phosphite | Tris(2,4-di-tert-butylphenvl) phosphite, available as IRGAFOS 168 | BASF |
| AO | Hindered phenolic antioxidant, available as IRGANOX 1076 | BASF |

The testing samples were prepared as described below and the following test methods were used.

All powder additives were combined together with the polycarbonate powder(s), using a paint shaker, and fed through one feeder to an extruder. Extrusion for all combinations was performed on a 25 mm twin screw extruder, using a melt temperature of 270-300° C. and 300 revolutions per minute (rpm), then pelleted. The glass fibers were fed separately through the hopper on a downstream side-feeder. The pellets were dried for 3 hours at 100° C. Dried pellets were injection molded at temperatures of 270-310° C. to form specimens for most of the tests below.

Melt volume rates were measured in accordance with the ISO-1133 standard. The granules were dried for 3 hours at 120° C.

Flammability tests were performed on samples at a thickness of 1.5 mm and 1.0 mm in accordance with the Underwriter's Laboratory (UL) UL 94 standard. In some cases, a second set of 5 bars was tested to give an indication of the robustness of the rating. In this report the following definitions are used as shown in Table 2. Total flame-out-times for all 5 bars (FOT=t1+t2) were determined. V-ratings were obtained for every set of 5 bars.

TABLE 2

| | $t_1$ and/or $t_2$ | 5-bar FOT | burning drips |
|---|---|---|---|
| V0 | <10 | <50 | no |
| V1 | <30 | <250 | No |
| V2 | <30 | <250 | Yes |
| N.R. (no rating) | >30 | >250 | |

Examples 1-5

The formulations and properties of Examples 1-12 are shown in Table 3.

TABLE 3

| Component | Unit | 1* | 2* | 3* | 4* | 5* | 6 | 7 | 8* | 9 | 10 | 11 | 12 |
|---|---|---|---|---|---|---|---|---|---|---|---|---|---|
| PC-2 | wt % | 89.27 | 79.27 | 69.27 | 59.27 | | | | | | | | |
| PC-3 | wt % | | | | | 89.27 | 79.27 | 59.27 | 89.27 | 69.27 | 69.17 | 69.17 | 69.07 |
| PPPBP-BPA | wt % | 0 | 10 | 20 | 30 | 0 | 10 | 30 | 0 | 20 | 20 | 20 | 20 |
| GF | wt % | 10 | 10 | 10 | 10 | 10 | 10 | 10 | 10 | 10 | 10 | 10 | 10 |
| TSAN | wt % | 0.2 | 0.2 | 0.2 | 0.2 | 0.2 | 0.2 | 0.2 | 0.3 | 0.3 | 0.4 | 0.3 | 0.4 |
| Rimar | wt % | 0.2 | 0.2 | 0.2 | 0.2 | 0.2 | 0.2 | 0.2 | 0.1 | 0.1 | 0.1 | 0.2 | 0.2 |
| PETS | wt % | 0.27 | 0.27 | 0.27 | 0.27 | 0.27 | 0.27 | 0.27 | 0.27 | 0.27 | 0.27 | 0.27 | 0.27 |
| Phosphite | wt % | 0.06 | 0.06 | 0.06 | 0.06 | 0.06 | 0.06 | 0.06 | 0.06 | 0.06 | 0.06 | 0.06 | 0.06 |
| Sum | wt % | 100 | 100 | 100 | 100 | 100 | 100 | 100 | 100 | 100 | 100 | 100 | 100 |
| Properties | | | | | | | | | | | | | |
| Ratio of RIMAR to TSAN | | 1:1 | 1:1 | 1:1 | 1:1 | 1:1 | 1:1 | 1:1 | 1:3 | 1:3 | 1:4 | 2:3 | 1:2 |
| MVR | cm³/10 min | 5 | 7 | 6 | 6 | 19 | 12 | 8 | 13 | 12 | 12 | 11 | 16 |
| Vicat B/50 | ° C. | 146 | 152 | 155 | 160 | 127 | 135 | 148 | 128 | 142 | 141 | 142 | 139 |
| Gloss at 60° | gloss units | 68 | 65 | 54 | 62 | 95 | 92 | 70 | 95 | 89 | 90 | 88 | 92 |
| UL94 rating, 1.5 mm | | V0 | V0 | V0 | V0 | V1 | V0 | V1 | V0 | V0 | V0 | V0 | V0 |
| Σt1 | | 9 | 7 | 9 | 10 | 66 | 20 | 11 | 29 | 15 | 19 | 20 | 20 |
| Σt2 | | 27 | 20 | 18 | 16 | 11 | 29 | 21 | 34 | 19 | 13 | 17 | 24 |
| nr drips | | 0 | 0 | 0 | 0 | 0 | 0 | 0 | 0 | 0 | 0 | 0 | 0 |

*Comparative Examples

Comparative Example 1 shows that BPA homopolycarbonate (PC-2) wherein the high-heat copolycarbonate (PPPBP-BPA) is absent did not provide an MVR of greater than 8 or a gloss at 60° greater than 70 gloss units. Incorporation of the high-heat copolycarbonate at various loadings (i.e., 10-30 wt %) failed to sufficiently improve the MVR and the gloss at 60°(see Comparative Examples 2-4). Comparative Example 5 shows that the poly(aliphatic ester-carbonate) (PC-3) in the absence of high-heat copolycarbonate resulted in an improved gloss value at 60° and an improved MVR, but failed to provide a Vicat softening temperature of at least 130° C. or a UL-94 flame test rating V0 at a thickness of 1.5 mm. Mixtures of the poly(aliphatic ester-carbonate) and the high heat copolycarbonate resulted in a desired combination of properties (Examples 6-7). Comparative Example 8 having a ratio of Rimar to TSAN 1:3 had similar properties to Comparative Example 5 wherein the ratio of Rimar to TSAN was 1:1. Therefore, when the high-heat copolycarbonate is absent in poly(aliphatic ester-carbonate) compositions, the ratio of Rimar to TSAN has little effect on the flame test rating of the composition. However, when the high heat copolycarbonate is used in combination with the poly(aliphatic ester-carbonate), with the Rimar to TSAN ratio ranging from 1:3 to 1:1, the MVR was at least 8 cm$^3$ per 10 min, the Vicat softening temperature was at least 130° C., the gloss at 60° was at least 70 gloss units, and the UL-94 flame test rating was V0 at a thickness of 1.5 mm. Therefore, Table 3 shows a unique synergism between a high heat co-polycarbonate, a poly (aliphatic ester-carbonate) and Rimar/TSAN for thin wall reinforced polycarbonate compositions (≤1.5 mm).

This disclosure further encompasses the following aspects.

Aspect 1. A reinforced polycarbonate composition comprising 50-95 wt % of a poly(aliphatic ester-carbonate); 5-40 wt % of a high heat copolycarbonate comprising high heat carbonate units derived from 1,1-bis(4-hydroxyphenyl)-3,3,5-trimethyl-cyclohexane, N-phenyl phenolphthalein bisphenol, 4,4'-(1-phenylethylidene)bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a,10b-diphenyl-coumarano-2',3',2,3-coumarane, or a combination thereof, preferably 1,1-bis(4-hydroxyphenyl)-3,3,5-trimethyl-cyclohexane, N-phenyl phenolphthalein bisphenol, or a combination thereof, and optionally comprising low heat carbonate units; 0.1-0.8 wt %, preferably 0.1-0.5 wt % of a $C_{1-16}$ alkyl sulfonate salt flame retardant; 0.1-0.8 wt %, preferably 0.1-0.5 wt % of an anti-drip agent; 5-35 wt % glass fibers; optionally 0.1-10 wt % of an additive composition; optionally 1-30 wt % of a polycarbonate different from the poly(aliphatic ester-carbonate) and the high heat copolycarbonate, wherein the polycarbonate has a molecular weight of less than 24,000 grams per mole, as measured via gel permeation chromatography using polystyrene standards and calculated for polycarbonate; wherein each amount is based on the total weight of the reinforced polycarbonate composition, which sums to 100 wt %.

Aspect 2: The reinforced polycarbonate composition according to Aspect 1, wherein a ratio of $C_{1-16}$ alkyl sulfonate salt flame retardant to anti-drip agent is from 1:4 to 4:1.

Aspect 3: The reinforced polycarbonate composition according to Aspect 1 or claim 2, wherein the poly(aliphatic ester-carbonate) has the formula

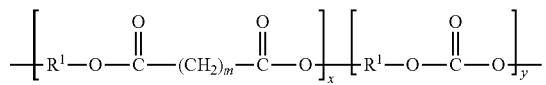

wherein m is 4-18, preferably 4-10; x:y is 99:1-1:99, or 13:87-2:98, or 9:91-2:98, or 8:92-13:87;
$R^1$ has the formula

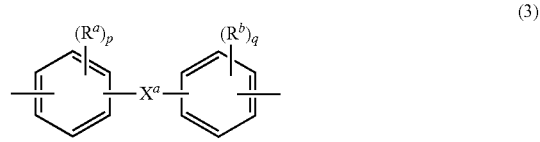

(3)

wherein: $R^a$ and $R^b$ are each independently a halogen, $C_{1-12}$ alkoxy, or $C_{1-12}$ alkyl, p and q are each independently integers of 0 to 4; $X^a$ is single bond, —O—, —S—, —S(O)—, —S(O)$_2$—, —C(O)—, or a $C_{1-60}$ organic group.

Aspect 4: The reinforced polycarbonate composition according to Aspect 3, wherein m is 8 and $R^1$ is bisphenol A.

Aspect 5: The reinforced polycarbonate composition according to any one of the preceding aspects, wherein the poly(aliphatic ester-carbonate) is a sebacic acid-bisphenol A copolymer having a weight average molecular weight from 18,000-25,000 grams/mole, preferably 20,000-25,000 grams/mole; or a sebacic acid-bisphenol A copolymer having a weight average molecular weight from 30,000-40,000 grams/mole, preferably 35,000-40,000 grams/mole, or a combination thereof, each as measured via gel permeation chromatography using polystyrene standards and calculated for polycarbonate.

Aspect 6: The reinforced polycarbonate composition of any one of the preceding aspects, wherein the low heat aromatic carbonate units are present and are derived from low heat aromatic group of the formula

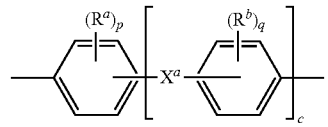

wherein $R^a$ and $R^b$ are each independently a halogen, $C_{1-3}$ alkoxy, or $C_{1-3}$ alkyl, c is 0 to 4, and p and q are each independently integers of 0 or 1, $X_a$ is single bond, —O—, —S—, —S(O)—, —S(O)$_2$—, —C(O)—, or a $C_{1-6}$ organic group, preferably the low heat carbonate units are derived from bisphenol A.

Aspect 7: The reinforced polycarbonate composition of any one of the preceding aspects, wherein the $C_{1-16}$ alkyl sulfonate salt flame retardant comprises potassium perfluorobutane sulfonate, potassium perfluoroctane sulfonate, tetraethylammonium perfluorohexane sulfonate, or a combination thereof, preferably potassium perfluorobutane sulfonate.

Aspect 8: The reinforced polycarbonate composition of any one of the preceding aspects, wherein the glass fiber is a bonding glass fiber, a non-bonding glass fiber, or a combination thereof, and wherein the glass fiber is a chopped glass fiber, a long glass fiber, a glass filament, a woven glass fiber, or a combination thereof.

Aspect 9: The reinforced polycarbonate composition of any one of the preceding aspects, wherein reinforced polycarbonate composition has a gloss of at least 70, preferably at least 80, more preferably at least 90, as measured according to ASTM D2457 at 60 degrees; a bromine or chlorine content, or a combined bromine and chlorine content of less than or equal to 100 parts per million by weight, less than or equal to 75 parts per million by weight, or less than or equal to 50 parts per million by weight, based on the total parts by weight of reinforced polycarbonate composition; a Vicat softening temperature of at least 130° C. as measured on 4 mm ISO bars in accordance with the ISO-306 standard at a load of 50 N and a heating rate of 50°/hr; a UL-94 flame test rating of V0 at a thickness of 1.5 millimeter; a melt volume rate of at least 8 cubic centimeters per 10 minutes, as determined by ISO 1133; or a combination thereof.

Aspect 10: The reinforced polycarbonate composition of any one of the preceding aspects, wherein the additive composition is present and comprises an impact modifier, a flow modifier, an antioxidant, a heat stabilizer, a light stabilizer, an ultraviolet light stabilizer, an ultraviolet absorbing additive, a plasticizer, a lubricant, a release agent, an antistatic agent, an anti-fog agent, an antimicrobial agent, a colorant, a surface effect additive, a radiation stabilizer, optionally, a flame retardant different from the $C_{1-16}$ alkyl sulfonate salt flame retardant, optionally, a filler different from the glass fiber, or a combination thereof.

Aspect 11: The reinforced polycarbonate composition of any one of the preceding aspects comprising: 50-95 wt % of a sebacic acid-bisphenol A copolymer as the poly(aliphatic ester-carbonate); 5-40 wt % of a high heat copolycarbonate derived from N-phenyl phenolphthalein bisphenol and bisphenol A; 0.1-0.5 wt % of potassium perfluorobutane sulfonate as the $C_{1-16}$ alkyl sulfonate salt flame retardant; 0.1-0.5 wt % of a poly(tetrafluoroethylene) encapsulated styrene-acrylonitrile copolymer as the anti-drip agent; and 5-35 wt % of the glass fibers, wherein each amount is based on the total weight of the reinforced polycarbonate composition, which sums to 100 weight percent, and a ratio of the potassium perfluorobutane sulfonate to the poly(tetrafluoroethylene) encapsulated styrene-acrylonitrile copolymer is 1:4 to 3:2.

Aspect 12: An article of any one of the preceding aspects, wherein the article is an extruded article, a molded article, pultruded article, a thermoformed article, a foamed article, a layer of a multi-layer article, a substrate for a coated article, or a substrate for a metallized article, preferably wherein the article is a molded article, preferably a molded housing.

Aspect 13: The article of Aspect 12, wherein the article is a housing, a frame, or an enclosure for an electronic, a medical, an automotive, or an electrical device, preferably, a computer or business machine housing, a housing for a hand-held electronic device, a component of a lighting fixture or home appliance, a component of a medical application or device, or a component of an interior or exterior component of an automobile.

Aspect 14: A method for forming the article of Aspect 12 or Aspect 13, comprising molding, casting, or extruding reinforced polycarbonate composition to provide the article.

Reinforced polycarbonate compositions, methods, and articles can alternatively comprise, consist of, or consist essentially of, any appropriate materials, steps, or components herein disclosed. Reinforced polycarbonate compositions, methods, and articles can additionally, or alternatively, be formulated so as to be devoid, or substantially free, of any materials (or species), steps, or components, that are otherwise not necessary to the achievement of the function or objectives of reinforced polycarbonate compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some aspects," "an aspect," and so forth, means that a particular element described in connection with the aspect is included in at least one aspect described herein, and may or may not be present in other aspects. In addition, it is to be understood that the described elements may be combined in any suitable manner in the various aspects. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—S(=O)$_2$-alkyl), a $C_{6-12}$ aryl sulfonyl (—S(=O)$_2$-aryl) a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —$CH_2CH_2CN$ is a $C_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A reinforced polycarbonate composition comprising
50-95 wt % of a poly(aliphatic ester-carbonate);
5-40 wt % of a high heat copolycarbonate comprising high heat carbonate units derived from 1,1-bis(4-hydroxyphenyl)-3,3,5-trimethyl-cyclohexane, N-phenyl phenolphthalein bisphenol, 4,4'-(1-phenylethylidene) bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a, 10b-diphenyl-coumarano-2',3',2,3-coumarane, or a combination thereof;
0.1-0.8 wt % of a $C_{1-16}$ alkyl sulfonate salt flame retardant;
0.1-0.8 wt % of an anti-drip agent;
5-35 wt % glass fibers;
optionally 0.1-10 wt % of an additive composition,
optionally 1-30 wt% of a polycarbonate different from the poly(aliphatic ester-carbonate), the high heat copolycarbonate, and the poly(carbonate-siloxane), wherein the polycarbonate has a molecular weight of less than 24,000 grams per mole, as measured via gel permeation chromatography using polystyrene standards and calculated for polycarbonate; and
wherein each amount is based on the total weight of the reinforced polycarbonate composition, which sums to 100 wt %.

2. The reinforced polycarbonate composition according to claim 1, wherein a ratio of $C_{1-16}$ alkyl sulfonate salt flame retardant to anti-drip agent is from 1:4 to 4:1.

3. The reinforced polycarbonate composition according to claim 1, wherein the poly(aliphatic ester-carbonate) has the formula

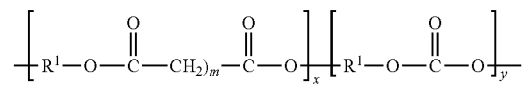

wherein m is 4-18, preferably 4-10;
x:y is 99:1-1:99, or 13:87-2:98, or 9:91-2:98, or 8:92-13:87;
$R^1$ has the formula

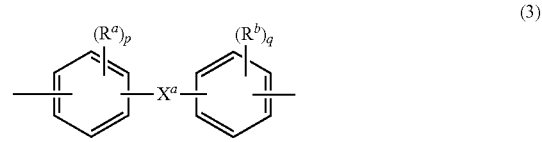

wherein:
$R^a$ and $R^b$ are each independently a halogen, $C_{1-12}$ alkoxy, or $C_{1-12}$ alkyl,
p and q are each independently integers of 0 to 4;
$X^a$ is single bond, —O—, —S—, —S(O)—, —S(O)$_2$—, —C(O)—, or a $C_{1-60}$ organic group.

4. The reinforced polycarbonate composition according to claim 3, wherein m is 8 and $R^1$ is bisphenol A.

5. The reinforced polycarbonate composition according to claim 1, wherein the poly(aliphatic ester-carbonate) is
a sebacic acid-bisphenol A copolymer having a weight average molecular weight from 18,000-25,000 grams/mole; or
a sebacic acid-bisphenol A copolymer having a weight average molecular weight from 30,000-40,000 grams/mole;
or a combination thereof,
each as measured via gel permeation chromatography using polystyrene standards and calculated for polycarbonate.

6. The reinforced polycarbonate composition of any one of claim 1, wherein the low heat aromatic carbonate units are present and are derived from low heat aromatic group of the formula

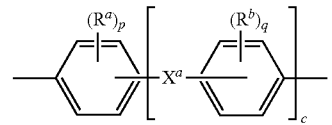

wherein $R^a$ and $R^b$ are each independently a halogen, $C_{1-3}$ alkoxy, or $C_{1-3}$ alkyl, c is 0 to 4, and p and q are each independently integers of 0 or 1, $X_a$ is single bond, —O—, —S—, —S(O)—, —S(O)$_2$—, —C(O)—, or a $C_{1-6}$ organic group.

7. The reinforced polycarbonate composition of claim 1, wherein the $C_{1-16}$ alkyl sulfonate salt flame retardant comprises potassium perfluorobutane sulfonate, potassium perfluoroctane sulfonate, tetraethylammonium perfluorohexane sulfonate, or a combination thereof.

8. The reinforced polycarbonate composition of claim 1, wherein the glass fiber is a bonding glass fiber, a non-bonding glass fiber, or a combination thereof, and wherein the glass fiber is a chopped glass fiber, a long glass fiber, a glass filament, a woven glass fiber, or a combination thereof.

9. The reinforced polycarbonate composition of claim 1, wherein reinforced polycarbonate composition has
- a gloss of at least 70 as measured according to ASTM D2457 at 60 degrees;
- a bromine or chlorine content, or a combined bromine and chlorine content of less than or equal to 100 parts per million by weight, based on the total parts by weight of reinforced polycarbonate composition;
- a Vicat softening temperature of at least 130° C. as measured on 4 mm ISO bars in accordance with the ISO-306 standard at a load of 50 N and a heating rate of 50°/hr;
- a UL-94 flame test rating of V0 at a thickness of 1.5 millimeter;
- a melt volume rate of at least 8 cubic centimeters per 10 minutes, as determined by ISO 1133;
- or a combination thereof.

10. The reinforced polycarbonate composition of claim 1, wherein the additive composition is present and comprises an impact modifier, a flow modifier, an antioxidant, a heat stabilizer, a light stabilizer, an ultraviolet light stabilizer, an ultraviolet absorbing additive, a plasticizer, a lubricant, a release agent, an antistatic agent, an anti-fog agent, an antimicrobial agent, a colorant, a surface effect additive, a radiation stabilizer, optionally, a flame retardant different from the $C_{1-16}$ alkyl sulfonate salt flame retardant, optionally, a filler different from the glass fiber, or a combination thereof.

11. The reinforced polycarbonate composition of claim 1 comprising
- 50-95 wt % of a sebacic acid-bisphenol A copolymer as the poly(aliphatic ester-carbonate);
- 5-40 wt % of a high heat copolycarbonate derived from N-phenyl phenolphthalein bisphenol and bisphenol A;
- 0.1-0.5 wt % of potassium perfluorobutane sulfonate as the $C_{1-16}$ alkyl sulfonate salt flame retardant;
- 0.1-0.5 wt % of a poly(tetrafluoroethylene) encapsulated styrene-acrylonitrile copolymer as the anti-drip agent; and
- 5-35 wt % of the glass fibers, wherein
- each amount is based on the total weight of the reinforced polycarbonate composition, which sums to 100 weight percent, and
- a ratio of the potassium perfluorobutane sulfonate to the poly(tetrafluoroethylene) encapsulated styrene-acrylonitrile copolymer is 1:4 to 3:2.

12. An article of comprising the reinforced polycarbonate composition of claim 1, wherein the article is an extruded article, a molded article, pultruded article, a thermoformed article, a foamed article, a layer of a multi-layer article, a substrate for a coated article, or a substrate for a metallized article.

13. The article of claim 12, wherein the article is a housing, a frame, or an enclosure for an electronic, a medical, an automotive, or an electrical device.

14. A method for forming the article of claim 12, comprising molding, casting, or extruding reinforced polycarbonate composition to provide the article.

15. The reinforced polycarbonate composition of claim 1, wherein the high heat copolycarbonate comprises high heat carbonate units derived from 1,1-bis(4-hydroxyphenyl)-3,3,5-trimethyl-cyclohexane, N-phenyl phenolphthalein bisphenol, or a combination thereof, and low heat carbonate units.

16. The reinforced polycarbonate composition of claim 1, wherein the low heat carbonate units are derived from bisphenol A.

17. The reinforced polycarbonate composition of claim 1, wherein the $C_{1-16}$ alkyl sulfonate salt flame retardant comprises potassium perfluorobutane sulfonate.

18. The article of claim 12, wherein the wherein the article is a molded article.

19. The article of claim 12, wherein the wherein the article is a molded housing.

20. The article of claim 12, wherein the article is a computer or business machine housing, a housing for a hand-held electronic device, a component of a lighting fixture or home appliance, a component of a medical application or device, or a component of an interior or exterior component of an automobile.

* * * * *